United States Patent [19]
Gotoh

[11] 3,871,333
[45] Mar. 18, 1975

[54] CULTURING OF PEARLS

[76] Inventor: Hideyuki Gotoh, 405, Shioya 1, Otaru-shi, Japan

[22] Filed: Apr. 15, 1974

[21] Appl. No.: 460,697

[52] U.S. Cl. ................................................ 119/4
[51] Int. Cl. ............................................ A01k 61/00
[58] Field of Search ........................................ 119/4

[56] References Cited
UNITED STATES PATENTS

| | | | |
|---|---|---|---|
| 1,328,008 | 1/1920 | Mikimoto | 119/4 |
| 2,126,024 | 8/1938 | Mikimoto | 119/4 |
| 3,113,554 | 12/1963 | Kanai | 119/4 |

*Primary Examiner*—Hugh R. Chamblee
*Attorney, Agent, or Firm*—Charles E. Temko

[57] ABSTRACT

A method of producing cultured pearls in abalones without endangering their lives, which comprises the steps of: perforating a hole through the shell of the abalone, depositing a nucleus bead on the reproductive organ of the abalone through said hole of the shell, covering the hole with a lid and bonding agent, and raising the thus treated abalone until the nacreous concretion to be gradually formed about the bed grows sufficiently great within the body of the abalone; in order to culture desirably round pearls, the method insures that the bead is firmly held in the prescribed position on said reproductive organ through the period of culturing.

8 Claims, 6 Drawing Figures

Fig. 1
Fig. 2
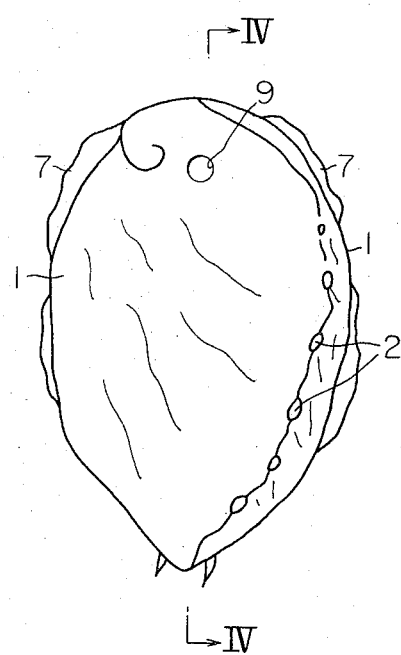
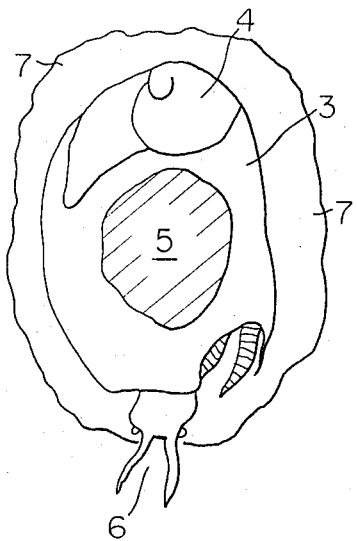
Fig. 3A   Fig. 3B
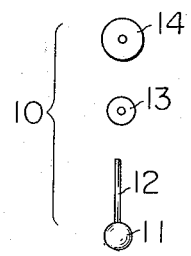
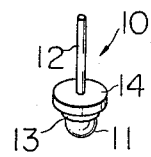
Fig. 5
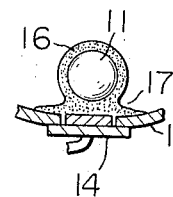
Fig. 4
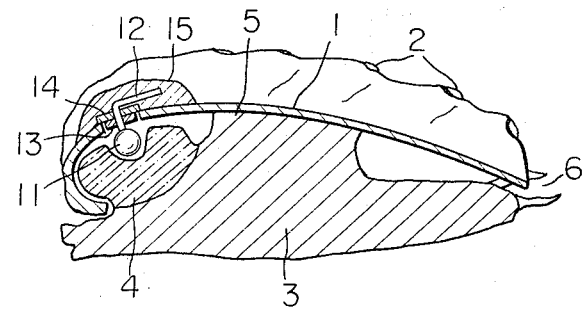

CULTURING OF PEARLS

BACKGROUND OF THE INVENTION

This invention concerns the method for the biological production of cultured pearls. More particularly, it relates to a method of culturing pearls in abalones of the genus Haliotis.

Today, the production of cultured pearls is made predominantly by use, as the mother shellfish, of pearl oysters (*Magaritifera martensii, Pinctada martensii*, etc.). However, the sea water areas of the world where pearl oysters can grow are extremely limited, and accordingly the produce or catch of pearl oysters, too, is limited. Consequently, it is currently difficult to increase the production of cultured pearls to cut their price.

In comparison to pearl oysters, the class of abalones is obtainable with more ease and at a lower cost, and the method of this invention therefore intends to utilize abalones in culturing pearls. To rely on abalones in culturing pearls, itself, is not necessarily an unprecedented art. For example, in Japan there have been various experiments made so as to culture pearls in abalones, but the results obtained are not satisfactory; in some instances, the pearls produced are not truly round but only hemispherical, and in other cases, the experiments attempting to obtain truly spherical pearls have only resulted in death of the mother shellfish at a high rate.

The method of culturing pearls in pearl oysters is a relatively old art and has been well developed today. However, the abalone is univalvular and requires a care or caution different from that taken in the case of pearl oysters which are bivalvular, and whether or not this point is carefully attended to influences greatly upon successful production of cultured pearls in abalones.

BRIEF SUMMARY OF THE INVENTION

The object of the present invention is to provide a method of producing truly round pearls by utilization of abalones as the mother shellfish, without endangering their health.

Abalones employable for the method of the invention are represented by Japanese Kuro-Awabi (*Haliotis discus*) and Ezo-Awabi (*Haliotis discus hannai*). Also suitably employable are California abalones grown in the Gulf of California, U.S.A., which are relatively large in size and have beautiful blue-gray nacre inside the shell, and they can culture highly desirable pearls.

To culture a pearl in an abalone in accordance with the method of this invention, a globule matter such as a bead which will form the nucleus of the product pearl is carefully deposited on the reproductive organ of the abalone through a hole perforated through its shell. Before this step is taken, suitably the abalone is to be preserved in a sea water condition for at least two weeks. Also, it is preferred that the deposition of the bead is made during a period of from November to February of the succeeding year.

Immediately after the deposition of the pearl nucleus bead, the hole of the shell is completely closed, and the so treated abalone is raised in a suitable fish preserve. Whereas the abalone will keep secreting nacreous substance surrounding the nucleus bead, in about ten to twelve months the concretion of the nacreous coating grows sufficiently thick within the abalone. Then, the crude pearl product detached from the shell is suitably polished to obtain a final pearl product.

In accordance with the present invention, it is feasible to securely hold the nucleus bead in the prescribed position within the body of an abalone, and obtain a truly spherical pearl without endangering the life of the abalone.

The above-mentioned object, features and advantages of the invention will become apparent upon consideration of the following description of the preferred embodiment taken in conjunction with the accompanying drawings.

BRIEF DESCRIPTION OF THE DRAWINGS

FIG. 1 is a plan view, showing the outside of the shell of an abalone in which to culture a pearl in accordance with the method of this invention;

FIG. 2 similarly is a plan view of an abalone, taken with its shell removed away for illustration of its body as seen from the dorsal side;

FIGS. 3A and 3B respectively show the disintegrated members and the assemblage of a nucleus bead assembly to be used in practicing the method of the invention;

FIG. 4 is a sectional view, taken along the line IV—IV of FIG. 1, showing the nucleus assembly inserted through the shell and seated on the reproductive organ of an abalone, in accordance with the method of the invention; and FIG. 5 is a partial sectional view, showing a nucleus bead coated with the nacreous substance and integrally attached to the inside surface of the shell.

DESCRIPTION OF PREFERRED EMBODIMENT

Referring to the drawings, the abalone illustrated in FIGS. 1, 2 and 4 thereof has a shell as indicated at a numeral 1, which has several aspiratory openings 2 near one side edge portion thereof. The body 3 within the shell, which includes a reproductive organ 4 near its posterior end, connects at its substantially central portion 5 to the inside surface of the shell. At the anterior end, the body has a mouth 6 through which the baits taken in is sent to the viscera including organ 4. The reference numeral 7 in FIGS. 1 and 2 denotes the foot of the abalone.

The method of the invention is put in practice initially by perforating a round hole or bore 9 through the shell at its portion corresponding to the location of the ovotistis or reproductive organ 4 of the body, in which a particular caution should be taken so that not only the ovotistis 4 itself but also the whole of the viscera should not be damaged at all. Also, it is to be observed that the hole 9 has a diameter substantially corresponding to the outside diameter of a nucleus globule or bead to be described.

In FIGS. 3A and 3B, the numeral 10 generically represents a pearl nucleus assembly, which includes the above-mentioned nucleus globule or bead, which is indicated at 11. This bead 11, which should preferably be of a truly round configuration, is made of a material not detrimental to live abalones, such as plastic resins, metals and so forth, and it is suitably secured to a thin wire or pin 12, which receives disc members 13 and 14 through the central bores of the discs. While the smaller inner disc 13 having an outside diameter substantially equivalent to the diameter of the hole 9, the larger outer disc 14 has a greater outside diameter in comparison to the bore of the hole so that said hole can be effectively covered up by the disc from outside.

As illustrated in detail in FIG. 4, the nucleus bead assembly 10 of the foregoing structure is inserted through the hole 9 of the shell into the body of the abalone in a manner such that the inner disc 13 and the bead 11 are spaced at the prescribed distance substantially comparable to the thickness of the nacreous concretion to be built layer upon layer about the bead 11. The inner disc 13 fits in the hole 9, which is closed by the outer disc or lid member 14.

Thus, the nucleus bead 11 is seated on or placed within the reproductive organ 4, and when the bead is disposed in the prescribed position within the body of the abalone, the portion of the wire or pin 12 protruding above the lid disc 14 is bent at the circumferential edge of the bore of the disc 14. In order to completely shut the opening 9 of the shell and hold the bead 11 firmly in place, a suitable amount of a water insoluble bonding agent or cement 15 is applied on the outside surface of the shell, sufficiently covering the disc 14 and the bent portion of the pin 12.

The abalone thus treated, which will be raised in a suitable fish preserve for a period of about ten to twelve months, conducts secretion of nacreous substance surrounding the nucleus bead deposited on its reproductive organ, apparently in its effort to alleviate its irritation caused by the presence in its body of the bead, a foreign matter, by coating the foreign matter with nacreous material.

As a result of concretion of the secreted nacreous material about the bead, there becomes a spherical protuberance as shown in FIG. 5 formed in the body of the abalone. This protuberance consists of the nucleus bead 11 and a nacreous coating 16 surrounding the nucleus, and at the base portion 17 of the protuberance the coating attaches itself to the inside of the shell.

Upon completion of culturing for the prescribed period of time, the abalone is taken out of the water, and the spherical protuberance recovered by breaking the shell is cut at its base portion 17 and detached from the shell. This crude product is suitably polished to obtain a truly round pearl. The nacreous concretion, that is, the pearls thus obtained present delicate colors such as pink, peacock-green, blue and so forth, the difference in colors being attributable to the difference in the particular species of the abalone employed.

Whereas I have described and illustrated a specific embodiment of the invention, the embodiment described in conjunction with several figures can be readily modified without departing from the concept of my present invention, and therefore the scope of my invention should not be understood to be limited to only the form as specifically disclosed and illustrated in the foregoing specification and accompanying drawings but is to be defined and limited only by the claims which follow.

I claim:

1. A method of culturing pearls in abalones, comprising the steps of: perforating a round hole through the shell of an abalone at its portion corresponding to the location of the reproductive organ of the abalone, inserting through said hole of the shell and depositing on the prescribed position on or within said reproductive organ a pearl nucleus, closing the hole of the shell and fixing the location of said pearl nucleus, raising the thus treated abalone for a sufficient period of time to let the nacreous concretion formed about the nucleus sufficiently grow within the body of the abalone, and taking out the nucleus coated with the nacreous substance from the abalone.

2. The method as claimed in claim 1, wherein said pearl nucleus consists of a truly round globule or bead made of a material not detrimental to the abalone, a wire or pin secured thereto, and a pair of an inner smaller and outer larger discs supported by said wire or pin, said smaller disc having an outside diameter substantially corresponding to the diameter of said hole of the shell, said larger disc having an outside diameter greater than said diameter of the hole.

3. The method as claimed in claim 2, wherein said globule or bead and said smaller disc are disposed with an interspace substantially corresponding to the desired thickness of the nacreous coating.

4. The method as claimed in claim 3, wherein subsequent to closing the hole of the shell with the larger disc after insertion of the globule or bead, said hole is covered with a water-insoluble bonding agent or cement.

5. The method as claimed in claim 1, wherein said treated abalone is raised for a period of about 10 months or more.

6. The method as claimed in Claim 1, wherein the abalones employed are Japanese Ezo-Awabi (*Haliotis discus hannai*).

7. The method as claimed in claim 1, wherein the abalones employed are California abalones.

8. The method as claimed in claim 1, wherein the deposition of the pearl nucleus and its attendant steps are taken during November to February of the succeeding year.

* * * * *